Dec. 24, 1929.  G. W. BLAIR  1,740,763
SLIDER OPERATED FASTENER AND MEANS FOR ASSEMBLING AND ALIGNING THE ELEMENTS
Filed Sept. 2, 1926
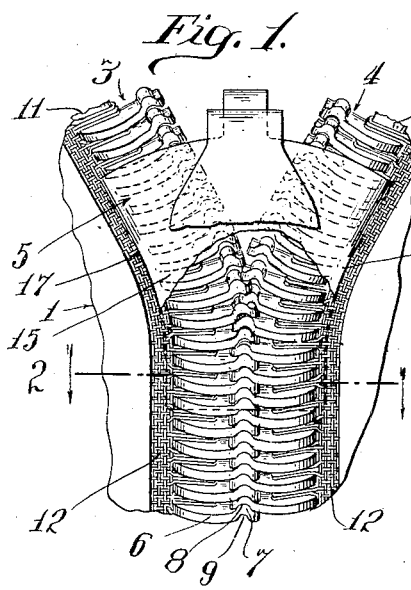
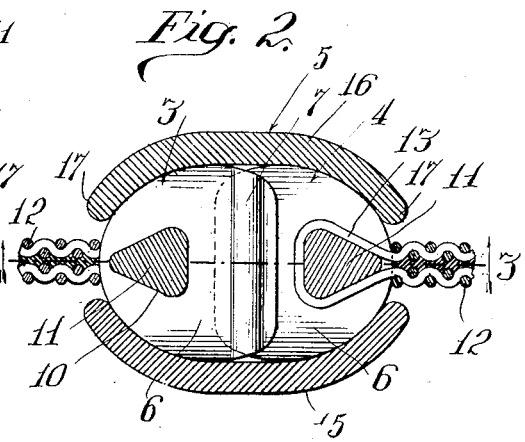
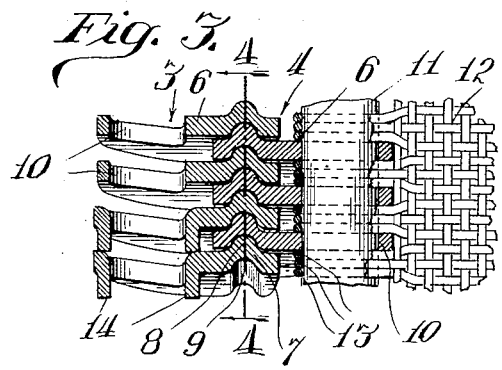
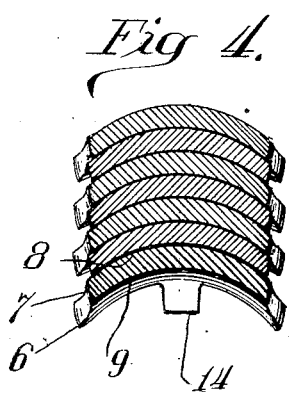
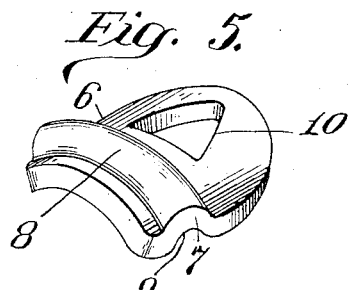
Inventor.
George W. Blair
By Eugene M. Giles
Attorney.

Patented Dec. 24, 1929

1,740,763

UNITED STATES PATENT OFFICE

GEORGE W. BLAIR, OF MISHAWAKA, INDIANA, ASSIGNOR TO MISHAWAKA RUBBER AND WOOLEN MANUFACTURING COMPANY, OF MISHAWAKA, INDIANA, A CORPORATION OF INDIANA

SLIDER-OPERATED FASTENER AND MEANS FOR ASSEMBLING AND ALIGNING THE ELEMENTS

Application filed September 2, 1926. Serial No. 133,108.

My invention relates to fasteners of the type comprising opposed series of fastener elements which are adapted to be interlocked and released by movement of a cam member or slider along the two series of elements, and has reference more particularly to the formation of the individual elements and its resultant effect on the performance of the assembled fastener and the manner of assembling the elements in series and mounting same for use.

In fastening devices of the type above referred to, it is desirable to use separate elements which are assembled in proper spaced relation on a suitable stringer or support and it is essential that the elements should be mounted securely so as to maintain the proper spaced relation and so that they are held substantially in alignment to prevent certain elements swinging around the axis of the mounting cord or stringer and interfering with or obstructing the movement of the slider or cam member along the series of elements. To afford a secure mounting which will prevent any possible displacement or separation of individual elements from or upon the cord or stringer, I provide my elements with apertures through which the cord or stringer is inserted, and the apertures are specially located so as to hold the elements in alignment and prevent swinging of individual elements laterally around the cord or stringer. I also form the apertures of an irregular shape and the cord or stringer is shaped or caused to assume a corresponding irregular shape whereby each element is, in effect, keyed against turning movement on the cord or stringer. Furthermore, I position the aperture for the cord or stringer on which the element is mounted as close as possible to the center of the element and preferably give to the element a somewhat circular form so as to avoid projecting corners or ends which would afford a leverage and increase the tendency of the individual element to swing out of place around the cord or stringer, and in view of the substantially circular form and the near center location of the stringer, any lateral displacement of the outer extremity of the element does not result in any substantial change in the alignment of the element.

The principal objects of my invention are to provide an improved fastening device; to permit the fastener elements to be made of thin plates pressed out and formed to the exact shape and size required; to insure a positive connection of the individual elements with the cord or stringer upon which they are mounted; to hold the elements in alignment and prevent lateral twisting or turning movement around the cord or stringer; to arrange the cord or stringer close to the center of the element and thereby minimize irregularity in alignments; to insure freedom of operation of the slider along the series of elements; to provide means whereby the elements are held in the proper spaced relation; and in general, to provide a simple form of element which may be easily and conveniently manufactured and assembled and which is compact in form and adapted to constitute a positive, dependable and durable fastener.

On the drawings:

Fig. 1 is a fragmentary front view of a fastening device embodying my improvements and showing the slider for operating same partly in section to disclose details;

Fig. 2 is an enlarged sectional view on the line 2—2 of Fig. 1;

Fig. 3 is a sectional view on the line 3—3 of Fig. 2, with the stringer omitted from the elements at one side and certain elements shown with a modification;

Fig. 4 is a sectional view on the line 4—4 of Fig. 3; and

Fig. 5 is a perspective view of an individual element.

Referring to the drawing, the reference numerals 1 and 2 indicate the parts which are to be connected, and 3 and 4 the fastener elements which are secured to the edges of the parts 1 and 2 respectively and adapted to be interlocked and released by the cam member or slider 5, which is mounted to slide on and along the two series of elements 3 and 4. The elements 3 and 4 are alike, and each comprises a plate 6 which may be made of rather thin sheet metal and is preferably of substantially circular form, and this plate 6 is rounded or arched from side to side as shown particularly in Fig. 4, and provided with a transverse corrugation 7 extending from side to side of the element adjacent one end. This corrugation provides a rib or projection 8 at the upper side of and extending entirely across the element and also provides a recess or transverse groove 9 in the under side which is open at both ends, and when the elements are brought together into the interlocking position with the ends of the elements on one side inserted between the end portions of the elements on the other side, the ribs 8 of the elements of each series engage in the recesses 9 of the adjoining elements of the other series, thereby locking the elements against separation. In view of the transversely arched or curved formation of the elements and the corresponding curvature of the corrugation 8 from end to end, the interlocked elements are held against transverse relative movement or slipping out of engagement sidewise, while at the same time this transverse curvature or arch form of the elements and the continuation of the transverse groove 9 through the lateral edges of the element, permits a rolling action between the elements when the fastener is flexed or doubled over sidewise, and this gives the fastener a very high degree of flexibility.

For mounting the elements, each member 6 is provided quite close behind the corrugation 7 and as near as possible to the center of the element, with an aperture 10, which is preferably of an irregular form as for example, substantially triangular as shown in Figs. 2 and 5, and the elements are threaded on a cord or stringer 11, which may be of a form corresponding to the form of the aperture 10 or adapted to assume the shape of the aperture when it is inserted therein. Other fasteners heretofore made with individual elements strung on a cord or stringer have not proved satisfactory due principally to the fact that the elements were not held securely in place and would become dislocated and thus interfere with the proper functioning of the fastener. With my construction the cord or stringer is not only arranged so close to the center of the element that liability of displacement is reduced to minimum and any displacement that might occur rendered unpronounced and ineffective to interfere with proper operation of the fastener, but by virtue of the irregular form of the aperture 10 and the cord or stringer 11, the elements are practically keyed on the cord or stringer and thereby held in proper alignment with the corrugations 7 superposed and in the same plane.

Moreover, with the triangular form of aperture arranged as shown, pulling strain on the elements tends to cause a wedge action of the cord in the tapered corner of the aperture and this tends to align the elements.

After the elements 6 are arranged in the proper spaced relation on the cord or stringer 11, the string of elements is then secured to a tape 12, which is in turn secured to the parts 1 or 2 in the usual manner. The tape 12 is prepared with a number of longitudinal threads between the lateral edges of the tape withdrawn or omitted in the weaving of the tape, so as to leave bare cross threads at the center, and in assembling the strings of fastener elements on the tape 12, the corrugated ends of the elements are inserted between the bare cross threads 13 and the latter folded around the cord or stringer 11 as shown in Figs. 2 and 3, after which the portions of the tape at the opposite extremities of the bare cross threads 13 are laid together and secured to one another by an adhesive or in any other convenient manner.

With this construction the fastener elements are permanently secured on the cords or stringers 11 and are held in alignment against lateral displacement around the cord or stringer and moreover, the assembled series of elements are securely mounted on the tape 12, while the bare threads 13 between adjoining elements, serve as a spacer to hold the elements in the proper relative position on the cord.

If further means is desired to insure the proper spacing of the elements on the cord or stringer 11, said elements may be provided with one or more fingers 14 at the edge of the aperture 10, preferably two such fingers being provided as shown in Fig. 3, and arranged respectively at the front and rear ends of the aperture 5; and these fingers are of sufficient length to engage the next adjoining element and hold the elements in the required spaced relation.

The slider 5 is of substantially the usual construction, being formed with a pair of divergent channels meeting in a single channel, through which the series of elements 3 and 4 are passed and by which the series of elements are spread apart at the upper end of the slider, so as to interlock and release the corrugations 7 of the opposed series of elements. The slider rides on the curved surfaces or edges of the elements 3 and 4, and the top and bottom wings, indicated at 15 and 16 respectively, therefore do not have abrupt inturned flanges along their lateral edges but their lateral edges are rounded or curved inwardly as indicated at 17, to approximately the same curvature as the outline of the assembled elements, which latter serve as a track upon which the slider operates. In view of this curved form of the elements and the curved edges of the slider wings 15 and 16, the slider operates smoothly along the series of elements 3 and 4 and any lateral displacement of individual elements that might occur is ineffective to interfere with the operation of the slider.

While I have shown and described my invention in a preferred form, I am aware that various changes and modifications may be made without departing from the principles of my invention, the scope of which is to be determined by the appended claims.

I claim as my invention:

1. In a fastening device of the class described, the combination of a fastener element comprising a substantially flat plate having a closed aperture extending through the top and bottom faces of the plate, a tape having an enlarged edge member engaged through the aperture of the plate for mounting the latter and interlocking means extending entirely across the plate adjacent one side of the aperture.

2. In a fastening device of the class described, the combination of a fastener element comprising a rounded substantially flat plate of a width substantially the same as the length and having a closed aperture near the center extending through the top and bottom faces of the plate, a tape having an enlarged edge member engaged through the aperture of the plate for mounting the latter, and said plate having interlocking means adjacent the aperture.

3. In a fastening device of the class described, the combination of a fastener element comprising a substantially circular and flat plate having an internal closed aperture adjacent the center and extending through the top and bottom faces of the plate for mounting the plate on a stringer, and said plate being formed adjacent the aperture with a projection on one side and a recess in the other side for interlocking with a correspondingly formed fastener element.

4. In a fastening device of the class described, the combination of a substantially flat fastener element having a closed aperture and means adjacent the aperture for interlocking with a similar fastener element, and a stringer engaging the walls of said aperture for mounting the element, said aperture being of substantially triangular form with a flat side next to the interlocking means to hold the element against turning movement around the stringer.

5. In a fastening device of the class described, the combination of opposed series of fastener elements and a slider operable therealong for interlocking and releasing said elements, each of said elements comprising a plate of a width substantially the same as its length and having interlocking means and with a closed aperture near the center and adjacent said interlocking means, a tape having an enlarged member in the edge threaded through the aperture of the plate, and means for holding the plates against turning movement around the stringer so as to maintain the interlocking means of each series of fastener elements in alignment.

6. In a fastening device of the class described, the combination of opposed series of fastener elements and a slider operable therealong for interlocking and releasing said elements, each of said elements comprising a substantially flat plate of a width substantially the same as the length and having a closed aperture of non-circular form adjacent the center and extending through the top and bottom faces of the plate and each plate having a projection at one side and a recess at the other side adjacent the aperture for interlocking said plate with an element of the opposed series, and a tape having an enlarged member in the edge threaded through and fitting the non-circular apertures of said plates to prevent turning movement of the plates on the stringer.

7. In a fastening device of the class described, the combination of opposed series of fastener elements and a slider operable therealong for interlocking and releasing said elements, each of said elements being a substantially flat plate of substantially circular form with a closed non-circular aperture near the center and extending through the top and bottom faces of the plate, means adjacent the aperture for interlocking engagement with a similar element of the opposed series, a folded strip of fabric having a stringer in the fold at the edge thereof and engaged through and fitting the apertures of each series of elements for mounting the elements and preventing turning movement of the elements on the stringer, and said strip of fabric having apertures through which the interlocking portions of the elements project.

8. In a fastening device of the class described, the combination of a plurality of fastener elements each comprising a plate having an aperture adjacent the center for mounting the plates on a stringer, fingers on each plate adjacent the aperture for holding the plates in spaced relation on the stringer, and a recess in one side and projection on the other side of each plate adjacent the aperture for interlocking engagement with a similar opposed fastener element.

GEORGE W. BLAIR.